(12) United States Patent
Lobertmann et al.

(10) Patent No.: US 6,327,719 B1
(45) Date of Patent: Dec. 11, 2001

(54) PORTABLE RESTROOM HAVING MOLDED BASE ASSEMBLY WITH INTERNAL TANK

(75) Inventors: Douglas E. Lobertmann, Prior Lake; Daniel J. Koughan, Eden Prairie; Ronald J. Holmstadt, Carver; Richard E. Eliasen, Hopkins; Todd Hilde, Hamel, all of MN (US)

(73) Assignee: Satellite Industries, Inc., Plymouth, MN (US)

( * ) Notice: Subject to any disclaimer, the term of this patent is extended or adjusted under 35 U.S.C. 154(b) by 0 days.

(21) Appl. No.: 09/522,816

(22) Filed: Mar. 10, 2000

(51) Int. Cl.$^7$ .................................................. A47K 11/02
(52) U.S. Cl. ............................................. 4/449; 52/79.1
(58) Field of Search ............................... 4/321–323, 449, 4/462, 463, 476–479, 483; 52/34, 79.1

(56) References Cited

U.S. PATENT DOCUMENTS

| | | | | |
|---|---|---|---|---|
| 3,835,480 | * | 9/1974 | Harding | 4/449 |
| 4,305,164 | * | 12/1981 | Sargent et al. | 4/462 |
| 4,377,875 | * | 3/1983 | Brubakken | 4/321 |
| 5,251,342 | * | 10/1993 | Samson et al. | 4/449 |
| 5,398,465 | * | 3/1995 | Tagg | 4/449 |
| 5,500,960 | * | 3/1996 | Tagg | 4/321 |
| 5,557,810 | * | 9/1996 | Antos et al. | 4/321 |
| 5,560,050 | * | 10/1996 | Tagg | 4/449 |
| 5,913,610 | * | 6/1999 | Duck | 4/321 |

FOREIGN PATENT DOCUMENTS

| | | |
|---|---|---|
| 1 092 823 | 4/2001 | (EP) . |
| WO 95/18273 | 7/1995 | (WO) . |

* cited by examiner

*Primary Examiner*—Charles R. Eloshway
(74) *Attorney, Agent, or Firm*—Oppenheimer Wolff & Donnelly LLP (57) ABSTRACT

In order to provide additional flexibility in a portable restroom, a base assembly is specifically designed to include an internal tank capable of maintaining and carrying flushing fluid. Thus, when a flushing restroom is desired, an additional tank is not needed. In order to convert to a flushing model, the base assembly is simply filled with appropriate liquid, and a pump is added. In addition to providing additional capabilities, the additional fluid in the base unit provides for more weight, thus increasing the stability. Also, the base assembly has a support structure which can be snap fit to the tank member. By allowing the snap fitting feature, the support structure can be designed very rugged, however will very easily and completely attach to the tank member.

17 Claims, 8 Drawing Sheets

PORTABLE RESTROOM HAVING MOLDED BASE ASSEMBLY WITH INTERNAL TANK

BACKGROUND OF THE INVENTION

The present invention relates to portable restrooms. More specifically, the invention relates to portable restrooms with a multipurpose base design that can also be used as a fluid tank.

Many situations exist where portable restrooms are a beneficial and convenient fixture. For example, where special events are conducted and large amounts of people are temporarily going to be in certain locations, it is very beneficial to add a large number of portable restrooms which can be selectively placed at a location and then removed after the event. Additionally, in certain seasonal situations, it is beneficial to utilize portable restrooms which can then be used seasonally. For example, golf courses may typically include portable restrooms which can then be removed during the off seasons. Construction sites also provide another situation where portable restrooms are beneficial.

Portable restrooms can be classified in two categories: (1) flushing; and (2) non-flushing. Fresh Flushing portable restrooms require the addition of a fluid supply so that this flushing capability can be provided. In these situations, an additional fluid tank is added to the restroom as an external component. Also, pumps and fluid handling equipment are necessary to provide the flushing function. While very beneficial, the additional fluid tank is very cumbersome and subject to vandalism. Also, this additional component adds cost to the restroom. Further, this additional component extends from the basic structure of the restroom and makes transportation much more difficult.

In non-flushing models, no additional fluid is utilized. The restroom simply includes a waste holding tank which can be serviced as necessary.

As can be expected, portable restrooms are typically moved quite often. Also, these portable restrooms are typically placed directly on the ground and may often be slid around to appropriately position them. Consequently, a rugged support structure is required on the bottom portion of the portable restroom. This structure must be able to support the weight of the restroom while also withstanding wear caused by continuous movement and repositioning.

As is easily recognized, it is very undesirable to have the portable restrooms easily tip or fall over. As is well known, these portable restrooms are typically placed outdoors and must withstand high winds and other conditions. Consequently, it is beneficial to provide a considerable amount of weight in the bottom portion of the restroom in order to provide stability. This will help to keep the structure upright and avoid tipping.

SUMMARY OF THE INVENTION

In order to provide a portable restroom design which provides a great number of advantages and meets many of the above-referenced requirements, a multipurpose base assembly is used. This base assembly includes two basic components—a supporting structure and a tank/floor member. The supporting structure is preferably molded, blow molded, or twin sheet formed using material which is preferably greater than 0.2 inches in thickness. In one version, the supporting structure includes two separate molded runners which are arranged in a substantially parallel configuration beneath the tank member. Additionally, the tank member includes an internal chamber capable of maintaining liquids. This internal chamber can then be utilized to provide flushing fluid in a flushing restroom. Alternatively, if the flushing capability is not desired, the tank feature is not utilized and this simply provides a support floor for the restroom.

In order to maintain the flushing capability and not puncture the internal tank, the tank member is designed with a number of attachment flanges to accommodate fasteners. Utilizing these attachment flanges, fasteners can be inserted through attachment points without puncturing or interfering with the internal chamber. Consequently, the internal chamber is maintained and can easily contain a liquid.

In addition to the fluid tank capabilities, the base assembly allows the support structure to be separately molded, utilizing a heavier design. More specifically, the support structure, or runners, can be molded utilizing thicker walled design thus increasing the weight of these components. This provides the additional benefit of adding weight to the bottom portion of the restroom. Also, this thicker plastic increases the durability of the support structure, thus better accommodating the typical handling of the restroom. In one version, the support structure includes a pair of runners which are attached at an outer portion of the assembly. These runners easily withstand the sliding of the restroom. Additionally, the runners are easily replaced should they become overly work or damaged.

In addition to the heavier weights, the runners of the present invention are provided with an interlocking configuration so that the tank member and runners can be connected in a more robust manner. More specifically, the runners are provided with tabs extending from one side thereof. Also, the tank member is provided with a number of recesses or openings specifically designed to accommodate these interlocking tabs. When mated together, the runners and tank member provide a snap fit or interlocking configuration. The rigidity and stability of the overall unit is then enhanced by adding fasteners, such as lag bolts, which more permanently attach the runners to the tank member. This snap fit or interlocking connection provides multiple advantages. First off, the runner and tank member will be held together to accommodate the placement of further fasteners. Obviously, this makes the assembly process much smoother and more efficient. Additionally, this interlocking feature provides longitudinal strength to the connection. Oftentimes, the restroom is pushed along the ground perpendicular to the direction of the runners. By having an interlocking connection between the tank member and the runners, the strength of the connection is enhanced. More specifically, the longitudinal forces are distributed between the interlocking tab members, rather than being directed exclusively to the connectors. Consequently, a more structurally sound, robust, and efficient connection is achieved by having this interlocking feature.

Occasionally, it is necessary to lift the restroom and place it at appropriate locations. This is typically done by utilizing an overhead crane or boom of some type which has a cable attached to an upper portion thereof. When lifted, the weight of the restroom is then carried at those connection points. By having the runners snap fit into the base unit, the weight of the runners is more evenly distributed throughout various portions of the base unit, and not simply carried by the fasteners themselves. This provides additional load handling and load distribution when the restroom is handled in this fashion.

The tank member is also a molded unit which includes both the internal chamber for maintaining liquid, and all necessary structural supporting members so that it can also operate as a restroom floor. That is, the tank member is designed with appropriate support members so that the weight of users and additional components can be handled. Machined within the tank member are appropriate openings to provide for fluid handling. Specifically, a filling opening is provided which can easily accommodate a standard garden hose. Consequently, this aids in the ability to fill the base unit tank with flushing fluid as necessary. Additionally, appropriate connection ports and openings are provided to allow a pump to be attached thereto and pump hoses to be inserted.

In order to accommodate easy filling and pumping of the base unit tank, a fluid handling structure is configured for attachment to the rear of the portable restroom. This fluid handling structure includes a bezel for both filling and pumping of base unit tank. The hose is configured to extend through a filling opening in base tank, and into the fluid supply area. The bezel structure is attached thereto, such that the insertion of a hose (garden hose) into an opening in the bezel allows fluid to flow into base unit tank. However, when it is necessary to remove fluid, this bezel and hose structure also accommodates this operation. That is, a service wand is positioned directly over the opening in the bezel structure. By drawing a vacuum on the service wand, fluid is then drawn back through the hose and bezel, out of the base unit tank. The advantage of this filling and pumping mechanism is that a large hole does not need to be placed directly in the base unit tank. More specifically, it is not necessary for the service wand to be inserted into the tank, therefore a large opening is not necessary.

It is an object of the present invention to provide a restroom base that includes an integral tank which can be used to contain flushing fluid. By incorporating this tank into the base, the need for an additional external fluid tank is eliminated.

It is an object of the present invention to provide a base assembly having all necessary structural support capabilities to allow proper operation of the restroom. Additionally, it is an object to have a base assembly which includes an integral fluid tank for maintaining flushing liquid therein.

It is a further object of the present invention to provide a base assembly which has additional mass and weight which can be placed in a lower portion thereof. This provides the additional advantage of overall stability for the portable restroom.

BRIEF DESCRIPTION OF THE DRAWINGS

Further objects and advantages of the present invention can be seen by referring to the following detailed description, and the drawings in which.

DETAILED DESCRIPTION OF PREFERRED EMBODIMENTS

Figure 1:
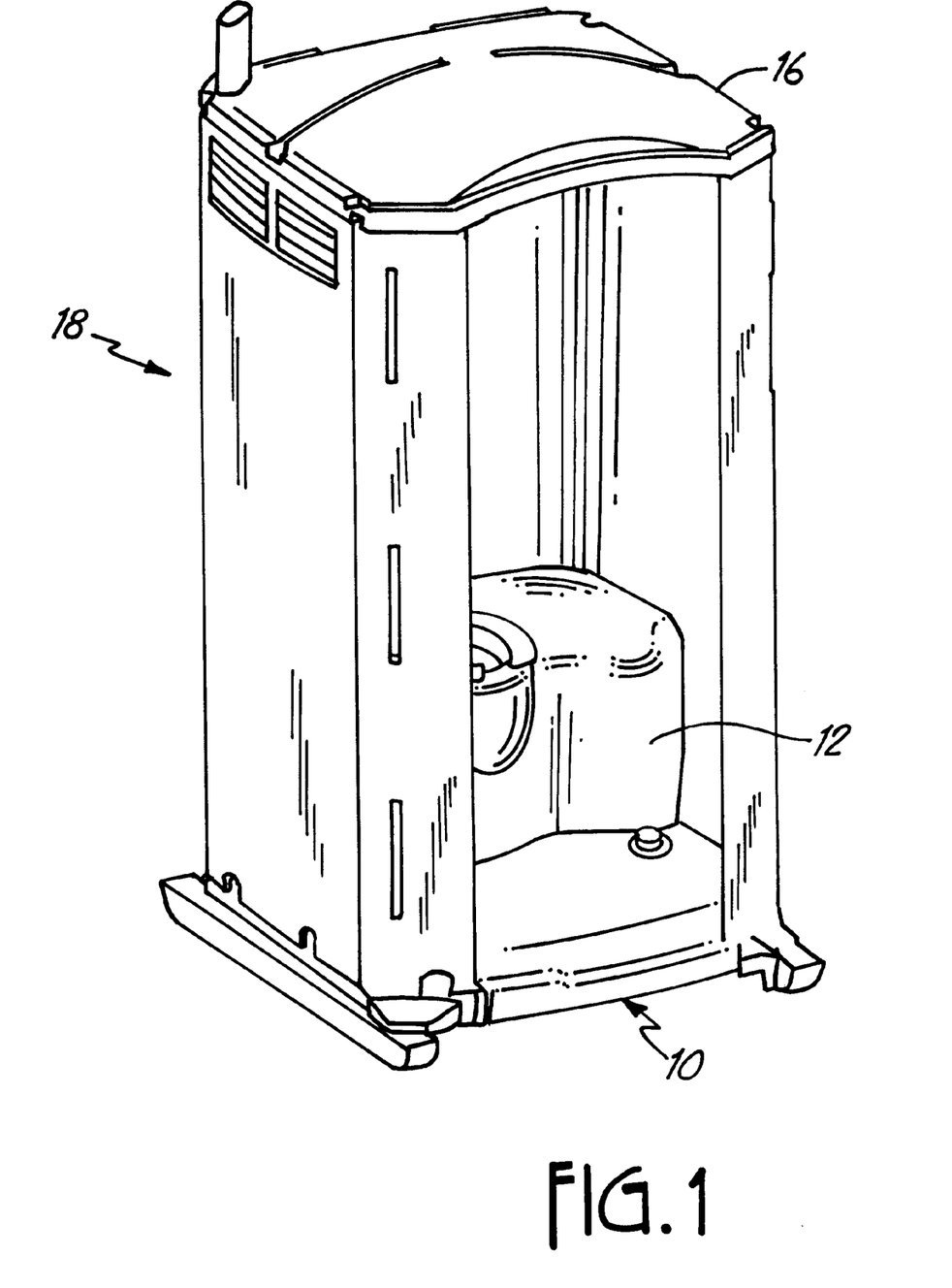
FIG. 1 is a perspective view of a portable restroom which includes the base assembly of the present invention.
Figure 2:
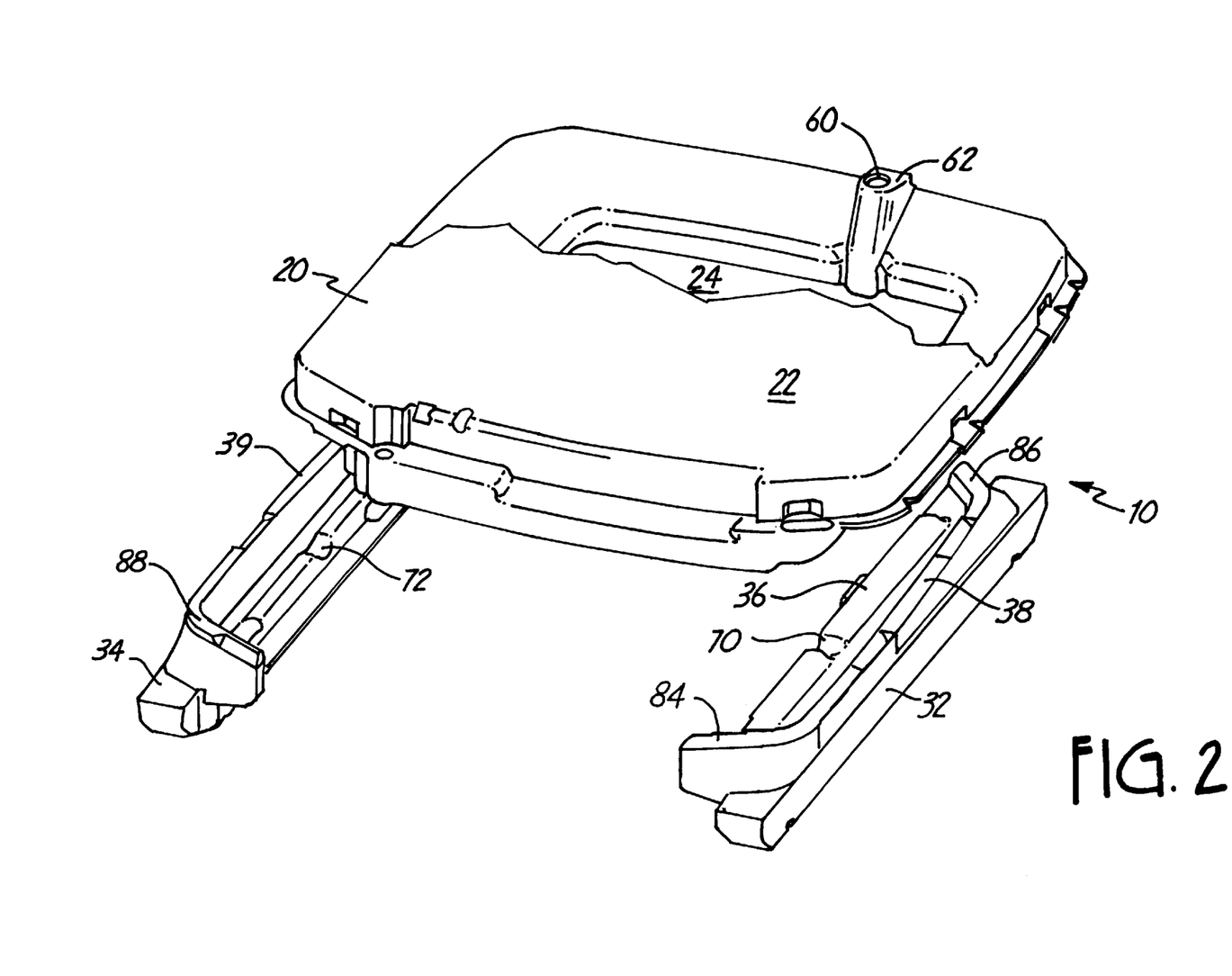
FIG. 2 is an exploded view of the components making up the base assembly.

Referring now to FIG. 1, there is shown a base assembly 10 for use in a portable restroom. As expected, this base assembly is situated on the bottom of the restroom and support all other necessary components 18. Those additional components 18 include a waste tank 12, enclosure walls 14, an enclosure roof 16, and an enclosure door (not shown). As shown in FIG. 2, base assembly 10 is comprised of a tank member 20 and a support structure 30. Support structure 30 consists of a first runner 32 and a second runner 34. Tank member 20 is supported by first runner 32 and second runner 34 and spans the distance there between. As more fully described below, tank member 20 includes a number of recesses and grooves on the bottom side thereof to receive both first runner 32 and second runner 34.

Figure 3:
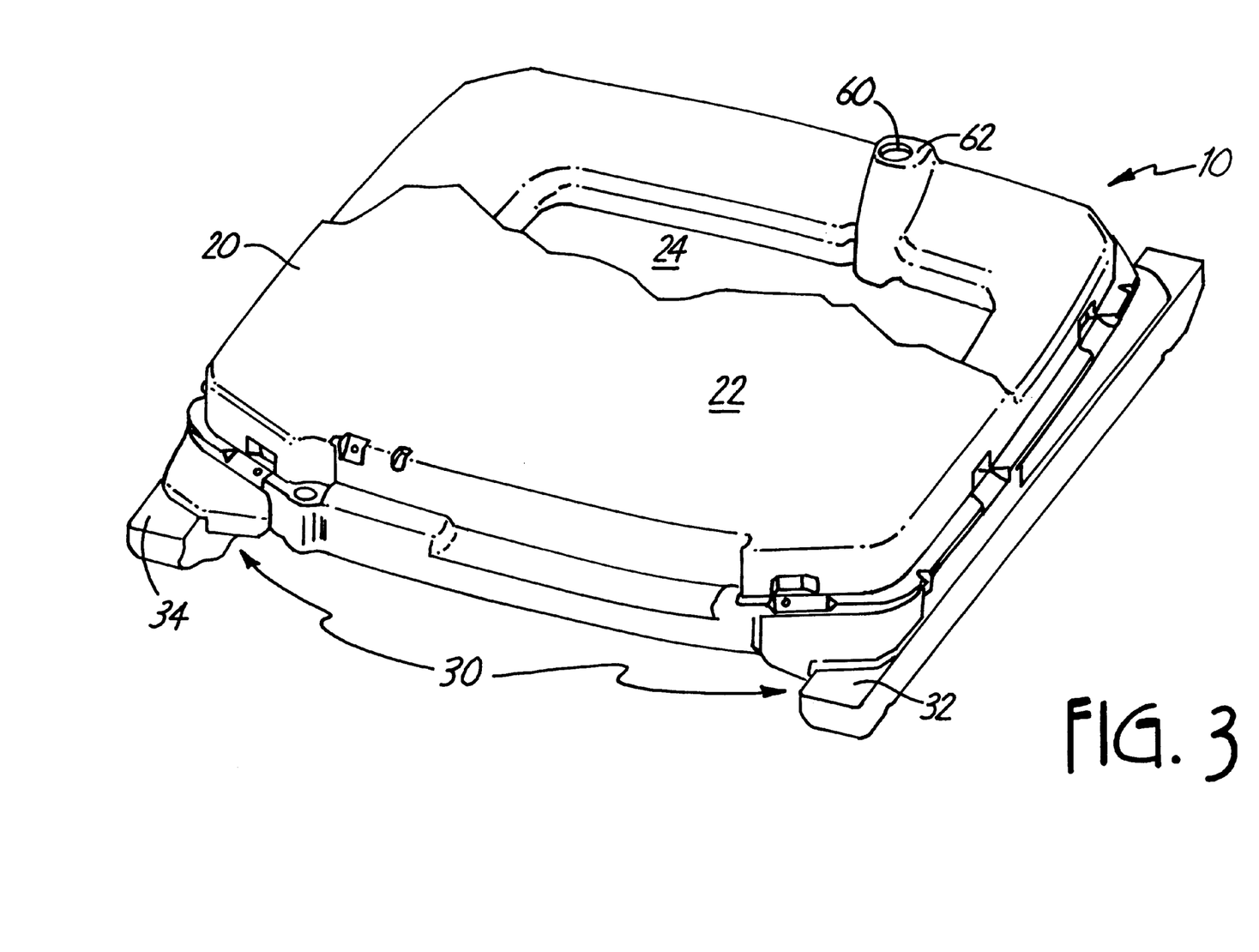
FIG. 3 is a perspective view of the base assembly.
Figure 7:
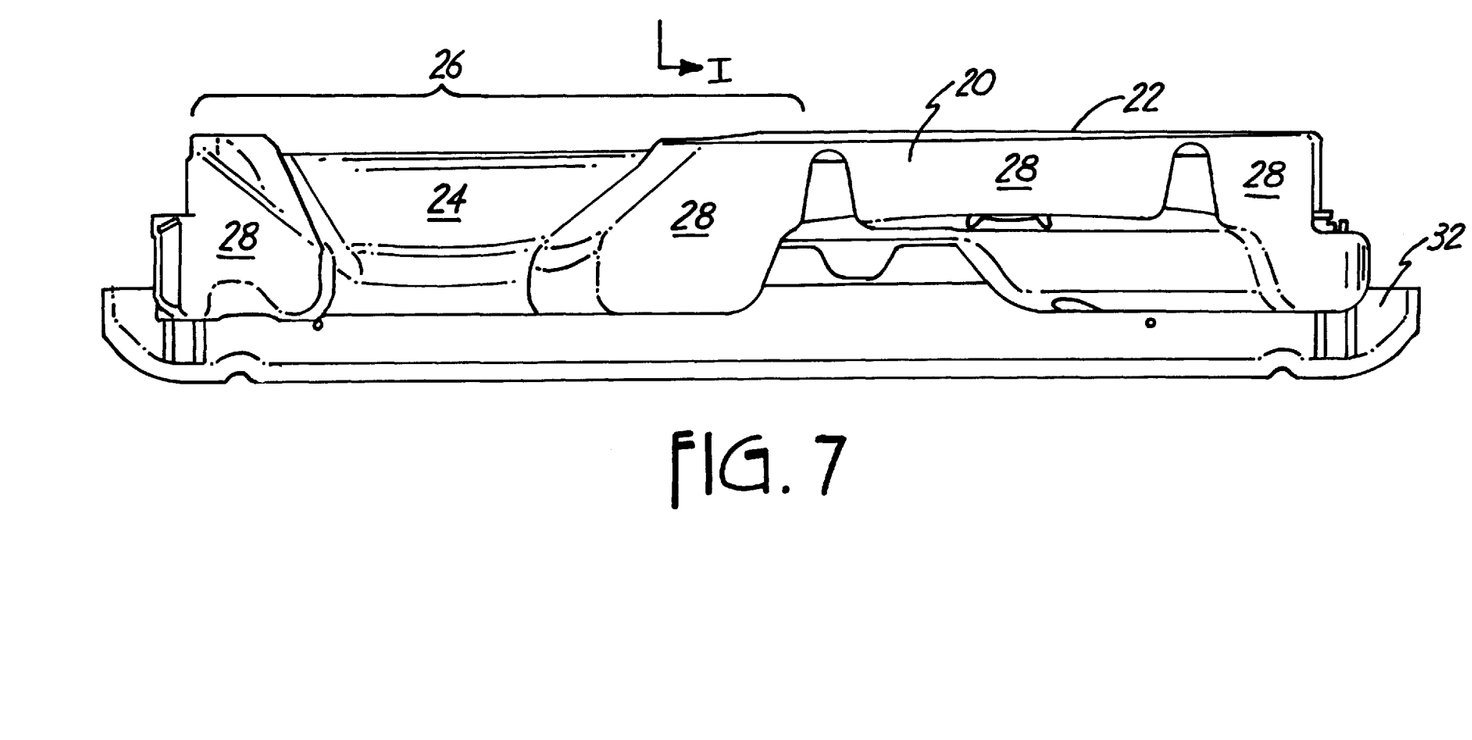

As can be seen in FIGS. 2 and 3, tank member 20 includes a planer upper surface 22 covering a portion thereof. Tank member 20 also includes a recess 24 in the back portion thereof. As expected, the waste tank 12 is typically positioned in the back portion of the portable restroom. Consequently, recess 24 is configured to accommodate waste tank 12. Referring to FIG. 7, which is a cross sectional diagram showing tank member 20 and first runner 32. As can be seen, recess 24 is situated in a back portion 26 of tank member 20.

Figure 4:
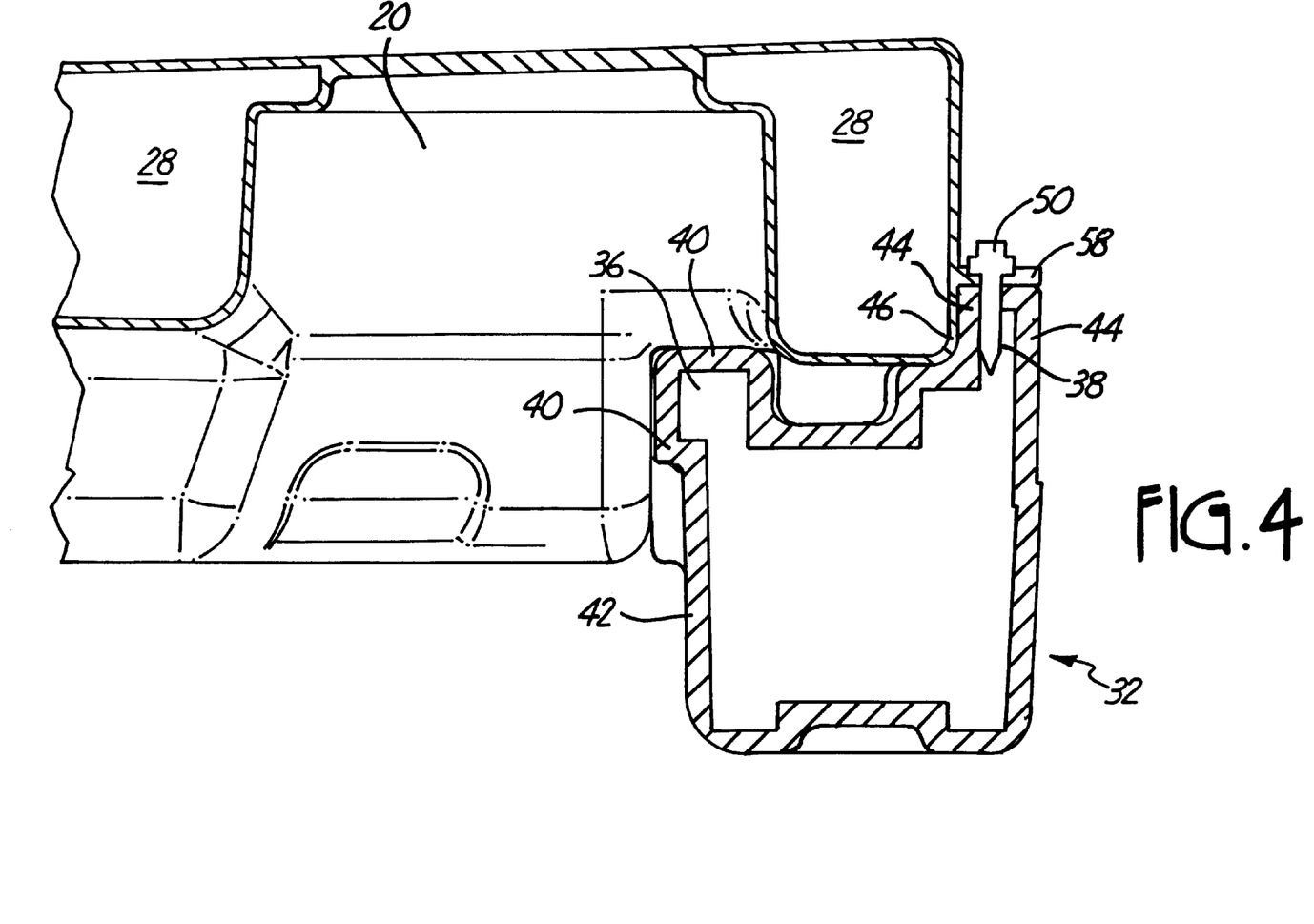
FIGS. 4 and 5 are cross sectional drawings showing the snap fit relationship between the runners and the tank member.
Figure 5:
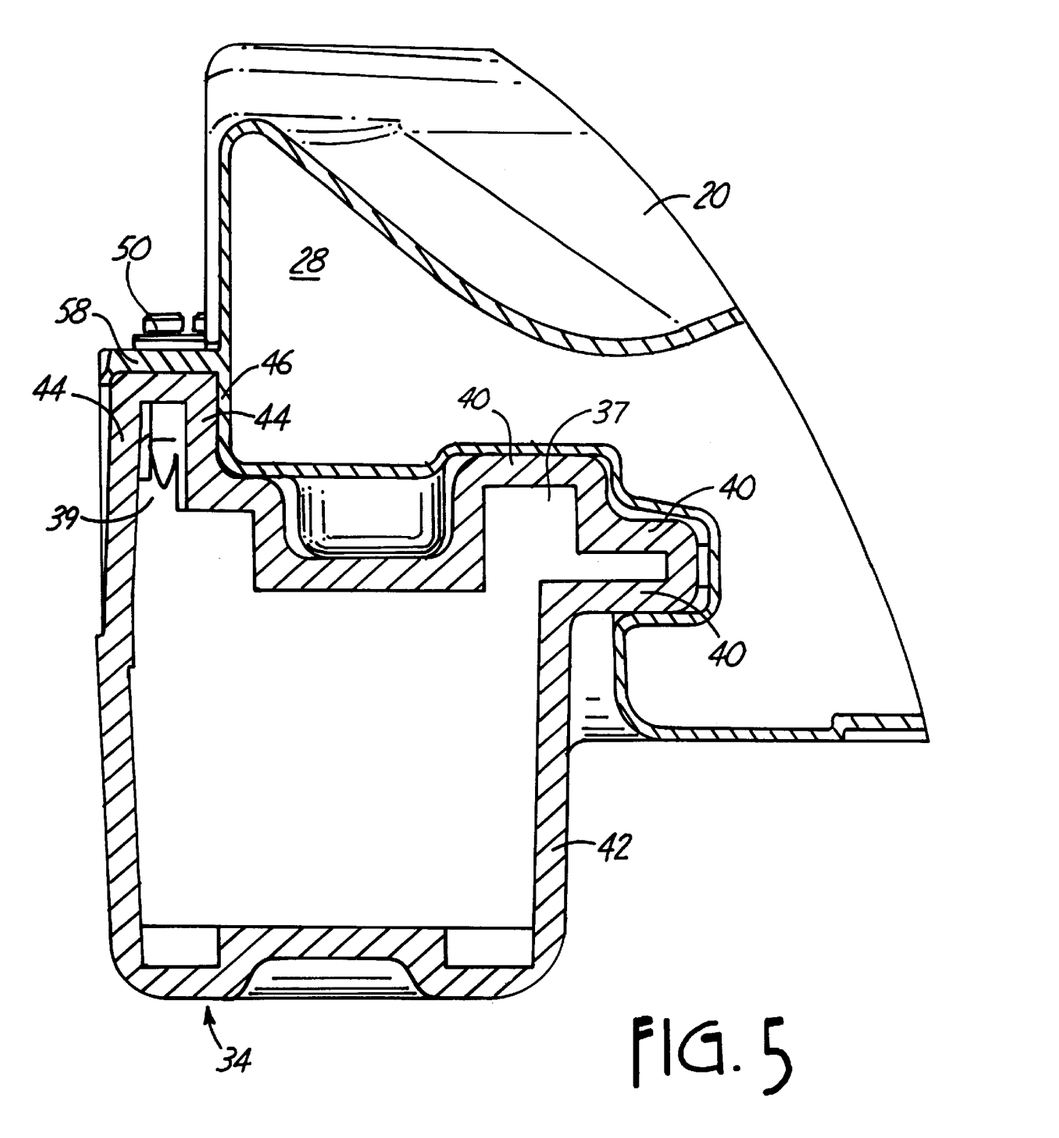
Figure 6:
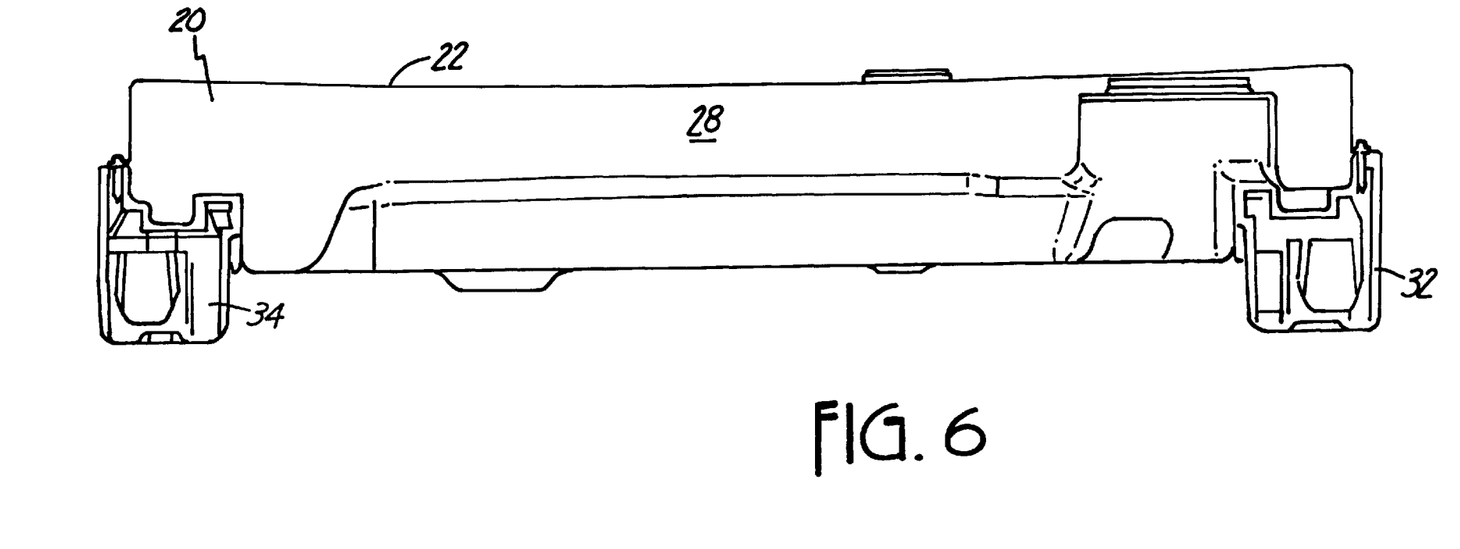
FIGS. 6 and 7 are cross sectional drawings showing the complete base assembly.

Referring now to FIGS. 4 through 6, the interrelationship between first runner 32, second runner 34, and tank member 20 can be more fully seen. First runner 32 and second runner 34 are specifically designed to have inward mating tabs 36 and 37 on an inner side thereof. Inward mating tabs 36 and 37 are specifically designed to mate with adjoining contours in tank member 20. Additionally, a first outer tab or outer rib 38 is designed into first runner 32, and second outer tab or outer rib 39 is designed into second runner 34. Again, outer tabs 38 and 39 are specifically configured to mate with adjoining surfaces in tank member 20. Inward tabs 36 and 37 can be configured in a number of maimers. However, it is important that inward tabs 36 and 37 have at least one horizontal or horizontally extending portion 40. These horizontal portions 40 extend from the main inner surface 42 of first runner 32 and second runner 34. Similarly, outer tab 38 includes at least one vertically extending portion 44. Vertically extending portions 44 are specifically designed and intended to mate with corresponding elements 46 of tank member 20. Once assembled, vertical member 44 and tank element 46 are juxtaposed in relation to one another.

Outer tabs 38 and 39, and inner tabs 36 and 37 are specifically configured and designed to provide for the snap fit attachment of first runner 32 and second runner 34. When assembled, these members are pressed in place and will stay attached until a predetermined amount of force is used to disassemble them. To further enhance attachment, a fastener 50 is used to connect first runner 32 and second runner 34 to tank member 20. Fastener 50 is typically a lag screw, however various types of fasteners, such as rivets, can be used.

By providing this snap fit connection between tank member 20 and first runner 32, multiple advantages are achieved. For example, assembly is simplified because the runners are held in place while fastener 50 is attached. Also, it is not uncommon for portable restroom 18 to be lifted at various times. By having first runner 32 and second runner 34 snap fit to tank member 20, the weight of first runner 32 and second runner 34 is evenly carried by multiple points in the assembly. If a snap fit connection was not used, all of the weight would simply be carried by the fastener, thus creating excessive strain thereon. This is especially beneficial as first runner 32 and second runner 34 are designed to be somewhat heavy, thus providing stabilization of restroom 18.

Referring again to FIG. 2, it can be seen that first runner 32 also includes a first recessed notch 70 on an inner portion thereof. This notch essentially consists of a cutout portion or notch in inward mating tab 36. Similarly, second runner 34 includes a second notch 72 on an inner portion thereof. First notch 70 and second notch 72 are designed to provide drainage for any fluid that may enter the recess formed between tabs 36 and 38.

As previously mentioned, it is not uncommon for restroom 10 to be moved and/or slid during use. If the restroom is slid along the axial direction of first runner 32 and second runner 34, forces will be naturally encountered by the various components of restroom 10. First notch and second notch 72 provide structure which can help handle these forces. Also, the pair of outer ribs 38 and 39 wrap around either side of the restroom to help deal with these forces. Specifically, a front portion 84 of outer rib 38 wraps around the front side of tank member 20. Similarly, a rear portion 86 of outer rib 38 wraps around the rear of tank member 20. Outer rib 39 of runner 34 has a similar front portion 88 and rear portion 90. If these structures were not present, this sliding force would be presented as a sheer force on connectors 50.

As previously mentioned, tank member 20 is provided with an internal chamber 28 which is specifically designed to function as a fluid tank. By utilizing this component as a fluid tank, a potentially cumbersome external component is eliminated. Again, all portable restrooms do not include a flushing capability. When this flushing feature is desired, an external fluid tank has typically been installed. By having internal chamber 28 function as an integrated fluid tank, the often cumbersome external fluid tank is eliminated. Additionally, by integrating the fluid tank into tank member 20, additional stabilization capabilities are achieved. That is, the inclusion of fluid in the base unit adds additional weight to a lower portion of restroom 18, thus providing further stability and potentially avoiding tipping.

As is expected, tank member 20 can be reconfigured in any number of different manners. Naturally, it is necessary to provide stability for tank member 20 as this also doubles as a restroom floor. Consequently, necessary load members must be included to support the weight of restroom users.

In order to accommodate fasteners 50, certain attachment features must be incorporated within the design of tank member 20. Naturally, care must be taken to insure that fasteners 50 do not puncture or in any way enter internal chamber 28. Referring again to FIGS. 5 and 6, it can be seen where tank member 20 includes attachment flanges 58 to accommodate this attachment. These attachment flanges are adapted to accommodate fasteners 50 passing there through, without interfering with internal chamber 28. As previously mentioned, a snap fit design is specifically used to further enhance attachment of first runner 32 and second runner 34 to tank member 20. This also helps to reduce the number of fasteners required in the assembly. Thus, fewer fasteners can be used in the overall design. This further helps by minimizing the need for special structures to accommodate fastening.

In order to accommodate operation as a flushing restroom, tank member 20 is provided with a filling hole 60, as seen in FIG. 2. Filling hole 60 is designed to accommodate a standard garden hose, or another fill hose to allow filling internal chamber 28 with fluid. Additionally, pump out structure 62 allows a vacuum wand to be placed against a fill port fitting, allowing fluid to be drawn from this tank.

Figure 8:
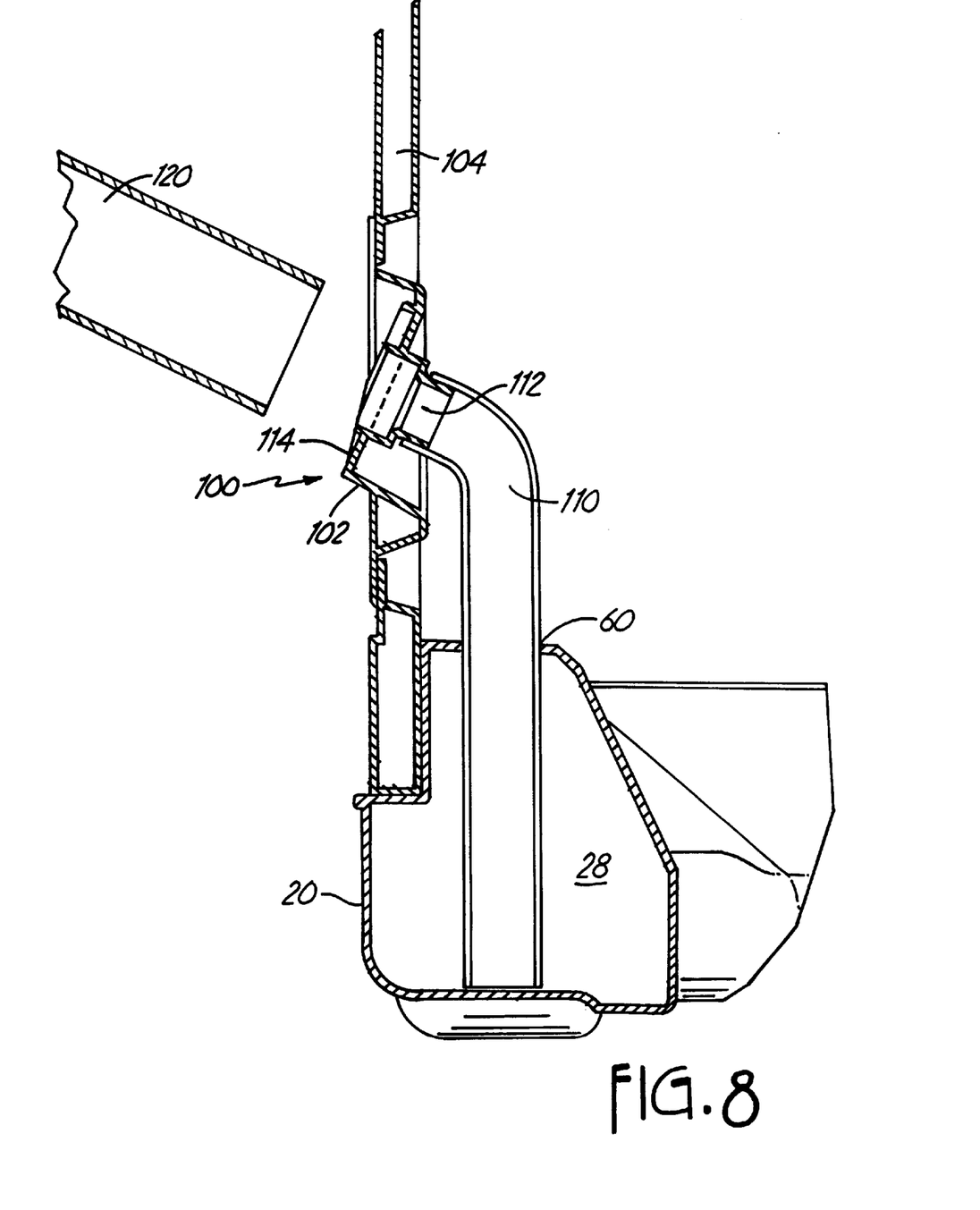
FIG. 8 is a cross sectional drawing of the vacuum bezel and fill structure used in the base tank.

Referring now specifically to FIG. 8, there is shown a cross sectional diagram illustrating a filling structure 100 used in cooperation with the base tank 20 of the present invention. Generally speaking, filling structure 100 includes a bezel 102 structure which is positioned on an outer surface of a restroom wall 104. Specifically, this filling structure 100 is situated on a rear panel or rear wall 104 of the restroom, thus is not easily seen by the customer. Attached to bezel 102 is a filling hose 110 which extends through filling hole 60 and into the interior 28 of tank member 20. This structure allows for easy filling and draining of fluid from tank member 20, should that be necessary.

The fill opening 112 of bezel 102 is specifically configured to allow a typical garden hose to be inserted there through. This accommodates easy filling of the base tank without the need for additional tools and/or adapters. Also, bezel 102 includes a flat sealing surface 114 which is configured to cooperate with a service wand 120, thus allowing the tank to be easily emptied. Service wand 120 is traditionally attached to a pump or vacuum mechanism, which is typically carried by a service vehicle. The operator can easily press service wand 120 against sealing structure 114, and operate the vacuum pump. By doing this, water is drawn from internal chamber 28 of tank member 20. After this water has been removed, the restroom can be easily moved or repositioned as necessary.

As can be appreciated, the specific configuration of tank member 20 may vary depending upon several factors. More specifically, if a different support structure is used, related changes must be made in tank member 20. For example, the support structure could easily be configured as a web or grid of support points (as opposed to first runner 32 and second runner 34). As can be easily appreciated, tank member 20 could appropriately be reconfigured to cooperate with this modified support structure. Despite this modification of elements, the integral tank can still be incorporated into this tank member design. As previously mentioned, having an integral tank member provides the distinct advantage of eliminating a separate tank.

Those skilled in the art will further appreciate that the present invention may be embodied in other specific forms without departing from the spirit or central attributes thereof. In that the foregoing description of the present invention discloses only exemplary embodiments thereof, it is to be understood that other variations are contemplated as being within the scope of the present invention. Accordingly, the present invention is not limited in the particular embodiments which have been described in detail therein. Rather, reference should be made to the appended claims as indicative of the scope and content of the present invention.

What is claimed is:

1. A base assembly for a portable restroom which is configurable to allow for a flushing capability, the base assembly comprising:

a plurality of molded runners, each runner having a plurality of attachment tabs, each runner further configured to be placed on a supporting surface and to carry the weight of the portable restroom; and a tank member attached to an upper portion of the plurality of runners such that the plurality of runners support the tank member such that the tank member is not contacting the supporting surface, the tank member having an upper surface configured to act as a floor for the portable restroom, the tank member further having an internal chamber for maintaining a liquid therein.

2. The base assembly of claim 1 wherein the tank member further includes a fluid supply opening to allow easy filling of the tank member and a pump attachment opening to accommodate the attachment of a fluid pump.

3. The base assembly of claim 1 wherein the molded runners and the tank member are attached to one another in an interlocking relationship.

4. The base assembly of claim 3 wherein the molded runners and tank member are further attached to one another using a fastener.

5. The base assembly of claim 4 wherein the fastener is a lag bolt.

6. The base assembly of claim 4 wherein the fastener is a rivet.

7. The base assembly of claim 4 wherein the fastener passes through an attachment location in the tank member and into an attachment region of the molded runner without entering or puncturing the internal chamber.

8. The base assembly of claim 3 wherein the molded runners include a plurality of tabs and the tank member includes a plurality of corresponding slots such that the plurality of tabs and the plurality of slots nest with one another to create the nesting attachment relationship.

9. The base assembly of claim 8 wherein the tank member includes a plurality of attachment flanges each configured to receive the fasteners, each of the attachment flanges configured such that the fastener will not interfere with the internal chamber.

10. The base assembly of claim 1 wherein the runners are blow molded.

11. The base assembly of claim 10 wherein the runners have wall a thickness greater than 0.2 inches.

12. The base assembly of claim 1 wherein the runners are twin sheet formed.

13. A base assembly for a portable restroom wherein the portable restroom is configurable to provide a flushing capability, the base assembly comprising:

a supporting structure, capable of supporting the restroom and constructed and arranged to withstand wear caused by movement and repositioning of the restroom and resist displacement of said supporting structure from its intended position relative to said restroom, said supporting structure including a plurality of tabs; and a base tank member operably attached to said supporting structure, said base tank member including an internal chamber capable of maintaining a liquid, an upper surface forming a floor of the portable restroom, and a bottom side including:
   a plurality of slots constructed and arranged to interlock with said tabs; and,
   a plurality of attachment flanges constructed and arranged to receive an attachment member such that said attachment member will not interfere with said internal chamber.

14. The base assembly of claim 13 wherein said attachment members are lag screws.

15. A portable restroom base assembly constructed and arranged to provide a flushing capability, the base assembly comprising:

a plurality of molded runners, each runner having a plurality of attachment tabs on an upper portion of said runner; and a tank member having an upper surface configured to act as a floor for the portable restroom, the tank member further having an internal chamber capable of maintaining a liquid therein, said tank member operably attached to said tabs in an interlocking relationship such that the plurality of runners support the tank member in such manner that the internal chamber is not contacting said runners.

16. The base assembly of claim 15 wherein said interlocking relationship comprises a snap-lock relationship.

17. The base assembly of claim 16 wherein said tank member includes a plurality of slots constructed and arranged to receive said tab in a snap-lock fashion, such that said tabs and said slots form said interlocking snap-lock relationship.

* * * * *